US012153534B2

(12) United States Patent
Delshadpour et al.

(10) Patent No.: US 12,153,534 B2
(45) Date of Patent: Nov. 26, 2024

(54) COMMUNICATIONS DEVICE (71) Applicant: NXP USA, Inc., Austin, TX (US)

(72) Inventors: Siamak Delshadpour, Phoenix, AZ (US); Kenneth Jaramillo, Gilbert, AZ (US); Regis Santonja, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/822,383

(22) Filed: Aug. 25, 2022

(65) Prior Publication Data
US 2024/0070100 A1  Feb. 29, 2024

(51) Int. Cl.
G06F 13/40   (2006.01)
G06F 13/42   (2006.01)

(52) U.S. Cl.
CPC ...... *G06F 13/4022* (2013.01); *G06F 13/4282* (2013.01); *G06F 2213/0002* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 9,356,577 B2 | 5/2016 | Sanchez et al. | |
| 9,804,991 B2 * | 10/2017 | Winemiller | G06F 13/4027 |
| 10,181,852 B1 * | 1/2019 | Tiwari | H03K 19/00361 |
| 10,659,051 B1 * | 5/2020 | Tiwari | H03K 19/018592 |
| 11,228,314 B1 * | 1/2022 | Delshadpour | H03K 19/017545 |
| 11,368,145 B1 | 6/2022 | Liu et al. | |
| 11,563,462 B1 * | 1/2023 | Rastogi | H03F 3/45197 |
| 2019/0125459 A1 * | 5/2019 | Shelton, IV | G16H 40/63 |
| 2019/0228768 A1 * | 7/2019 | Kim | G06F 1/08 |
| 2021/0208668 A1 * | 7/2021 | Natarajan | G06F 1/3287 |
| 2022/0069710 A1 * | 3/2022 | Vispute | H02M 1/08 |
| 2022/0283624 A1 * | 9/2022 | Bajpai | G06F 1/3253 |
| 2023/0028275 A1 * | 1/2023 | Rastogi | H03F 3/45197 |
| 2023/0155628 A1 * | 5/2023 | Rastogi | H04B 3/36 375/211 |
| 2023/0170934 A1 * | 6/2023 | Gupta | G06F 13/4045 375/211 |

OTHER PUBLICATIONS

Embedded USB2 (eUSB2) Physical Layer Supplement to the USB Revision 2.0 Specification—Rev. 1.1; retrieved from internet https://www.usb.org/sites/default/files/eUSB2_1p1_20180917.pdf; 158 pages (2018).
Giangrandi; "Transmission line reflections, standing waves and return loss"; retrieved from internet https://www.giangrandi.org/electronics/anttool/swr.shtml on Aug. 19, 2022; 4 pages (Created—Sep. 2000, Updated—Nov. 2012).

(Continued)

*Primary Examiner* — Henry Tsai
*Assistant Examiner* — Christopher A Bartels (57) ABSTRACT

One example discloses a communications device, including: an interface port, configured to couple the communications device to another device; a transmitter configured to transmit signals on the interface port; a receiver configured to receive signals on the interface port; and a switch configured to short the interface port to a reference potential after the transmitter transmits signals on the interface port.

17 Claims, 7 Drawing Sheets

(56) References Cited

OTHER PUBLICATIONS

Hughes, M; "How to Eliminate Reflection Noise in Your Next PCB Design"; retrieved from internet https://www.allaboutcircuits.com/technical-articles/how-to-eliminate-reflection-noise-in-your-next-pcb-design/ on Aug. 19, 2022; 8 pages (Dec. 19, 2018).
Texas Instruments; "Application Report eUSB2 Repeater Design Guide-SLLA500"; retrieved from internet https://www.ti.com/lit/an/slla500/slla500.pdf?ts=1659061217944&ref_url=https%253A%252F%252Fwww.google.com%252F; 8 pages (Dec. 2020).
Lin, Z., Texas Instruments; "Understanding the embedded USB2 (eUSB2) standard"; retrieved from internet https://e2e.ti.com/blogs_/b/analogwire/posts/understanding-embedded-usb2-eusb2 on Aug. 19, 2022; 3 pages (Aug. 19, 2019).
U.S. Appl. No. 17/406,405 (33 pages, filed Aug. 19, 2021).
U.S. Appl. No. 17/448,515 (26 pages, filed Sep. 22, 2021).
U.S. Appl. No. 17/449,776 (28 pages, filed Oct. 1, 2021).
U.S. Appl. No. 17/474,209 (34 pages, filed Sep. 14, 2021).
U.S. Appl. No. 17/475,965 (28 pages, filed Sep. 15, 2021).
Wikipedia; "Reflections of signals on conducting lines"; retrieved from internet https://en.wikipedia.org/wiki/Reflections_of_signals_on_conducting_lines on Aug. 19, 2022; 10 pages.

* cited by examiner

COMMUNICATIONS DEVICE

The present specification relates to systems, methods, apparatuses, devices, articles of manufacture and instructions for communications.

SUMMARY

According to an example embodiment, a communications device, comprising: an interface port, configured to couple the communications device to another device; a transmitter configured to transmit signals on the interface port; a receiver configured to receive signals on the interface port; and a switch configured to short the interface port to a reference potential after the transmitter transmits signals on the interface port.

In another example embodiment, the switch is configured to short the interface port to the reference potential after the transmitter transmits signals on the interface port.

In another example embodiment, the switch is configured to short the interface port to the reference potential before the transmitter transmits signals on the interface port.

In another example embodiment, the switch is configured to short the interface port to the reference potential both before and after the transmitter transmits signals on the interface port.

In another example embodiment, further comprising a signal detector configured to enable the transmitter in response to a signal to be transmitted on the interface port and disable the transmitter after the signal is transmitted.

In another example embodiment, the signal detector is a squelch detector.

In another example embodiment, the switch is coupled to the signal detector and configured to short the interface port to the reference potential when the signal detector disables the transmitter.

In another example embodiment, the interface port is a USB2 interface port.

In another example embodiment, the switch is configured to short the interface port to the reference potential when the signal detector enables the transmitter.

In another example embodiment, the interface port is an eUSB interface port.

In another example embodiment, the reference potential is at least one of: a ground reference, a voltage supply reference, or a differential signal line.

In another example embodiment, further comprising a trigger circuit coupled between the signal detector and the switch; wherein the trigger circuit is configured to pulse the switch when the transmitter is at least one of enabled or disabled.

In another example embodiment, the trigger circuit is a one-shot circuit.

In another example embodiment, the interface port includes a first differential line and a second differential line; and the signal is a differential signal.

In another example embodiment, the switch is a first switch and the reference potential is a first reference potential; the first switch is configured to short the first differential line to the first reference potential when the signal detector enables the transmitter; further comprising a second switch configured to short the second differential line to a second reference potential when the signal detector disables the transmitter.

In another example embodiment, further comprising a third switch configured to short the first differential line to the second differential line when the signal detector disables the transmitter.

In another example embodiment, the differential signal lines are compliant with either a USB standard protocol or an eUSB standard protocol.

In another example embodiment, the interface port is a first interface port, the receiver is a first receiver and the transmitter is a first transmitter; the communications device includes a second interface port, a second transmitter and a second receiver; the second transmitter is configured to transmit the signals received by the first receiver through the second interface port; the second receiver is configured to receive signals from the second interface port; and the first transmitter is configured to transmit the signals received by the second receiver through the first interface port.

In another example embodiment, the communications device is embedded in at least one of: a bidirectional repeater, a bidirectional level-shifter, or a transceiver.

In another example embodiment, the another device is at least one of: another circuit in a chip, another chip, another device, a communications cable, or a wireless antenna.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

USB (e.g. v2.0) has been one of the most successful wired interfaces in the past 20 years, and almost all SoCs today are equipped with a USB 2.0 interface. USB standards evolution kept the original 3.3-V I/O USB 1.0 interface intact for backward compatibility, helping enable wider adoption and a larger ecosystem while also preserving device interoperability. However, as process nodes approach more advanced node (e.g. 5 nm), the manufacturing cost to maintain USB 2.0 3.3V I/O signaling has grown exponentially.

Embedded USB2 (eUSB2) is a supplement specification to the USB 2.0 specification that addresses issues related to interface controller integration with advanced system-on-chip (SoC) process nodes by enabling USB 2.0 interfaces to operate at I/O voltages of 1V or 1.2V instead of 3.3V. eUSB2 can enable smaller, more power-efficient SoCs, in turn enabling process nodes to continue to scale while increasing performance in applications such as smartphones, tablets and notebooks. In some examples, designers integrate the eUSB2 interface at a device level while leveraging and reusing the USB 2.0 interface at a system level. eUSB2 can support onboard inter-device connectivity through direct connections as well as exposed connector interfaces through an eUSB2-to-USB 2.0 repeater for performing signal exchanges.

The following Table presents some differences between USB 2.0 and eUSB2:

| Feature | USB 2.0 | eUSB2 |
|---|---|---|
| Signal interface | D+, D− | eD+, eD− |
| I/O voltage | 3.3 V (Low-speed/full-speed), <1 V (High-speed) | 1 V or 1.2 V |
| Supported data rate | Low speed: 1.5 Mbps | Low speed: 1.5 Mbps |
| | Full speed: 12 Mbps | Full speed: 12 Mbps |
| | High speed: 480 Mbps | High speed: 480 Mbps |

Figure 1A:
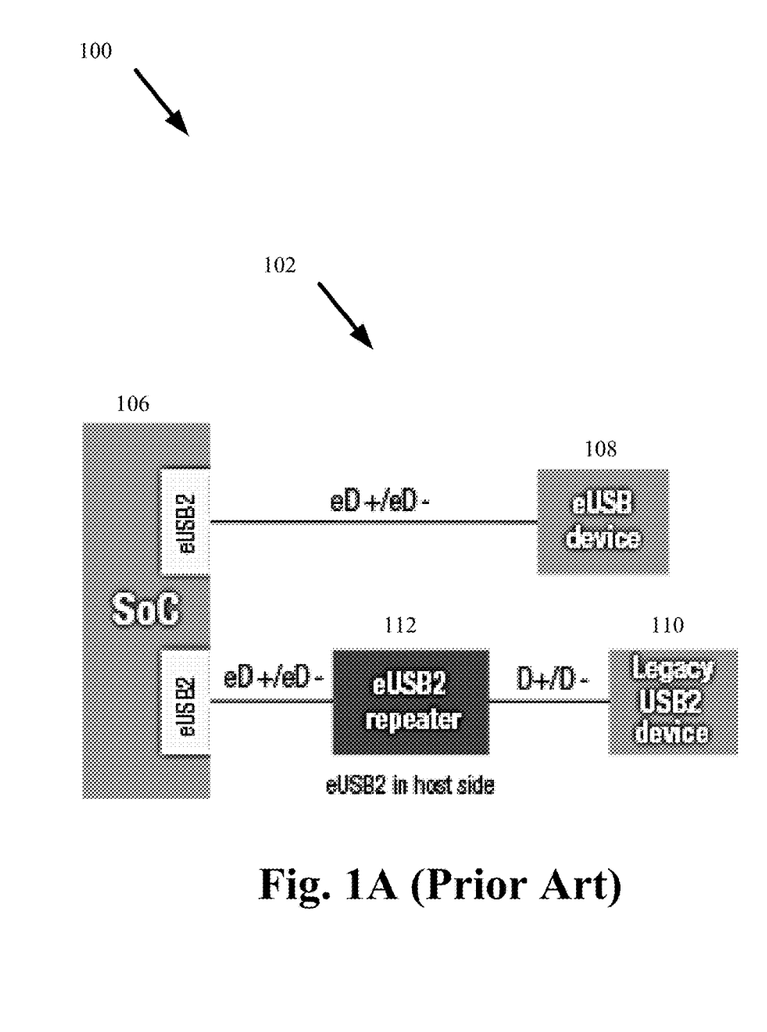
FIGS. 1A and 1B represents examples of two eUSB to USB configurations requiring level-shifting.
Figure 1B:
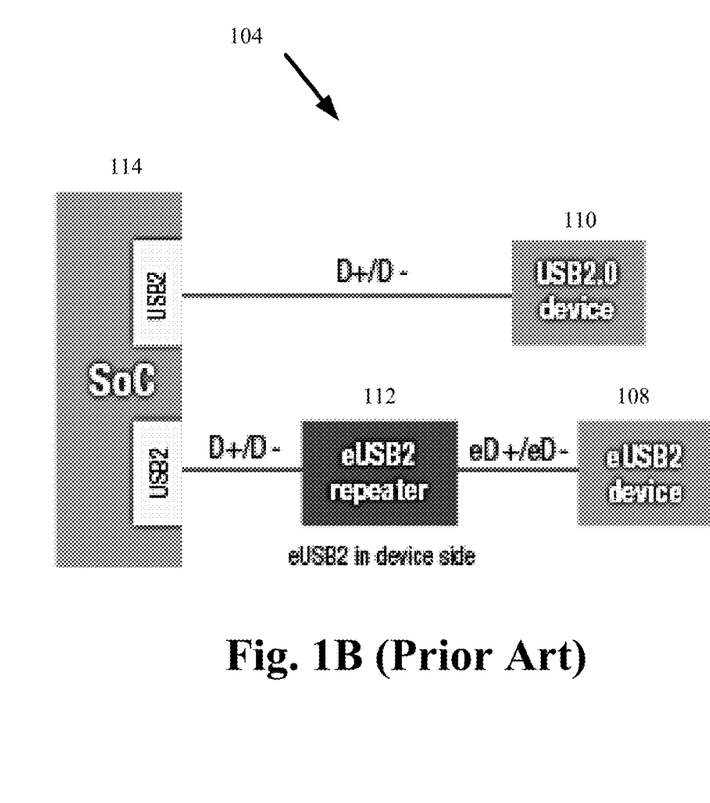

FIGS. 1A and 1B represents examples 100 of two eUSB/USB configurations 102, 104 requiring differential-signal-detection.

The first configuration 102 includes a system on a chip (SoC) having two eUSB embedded interfaces (as shown). The chip 106 is configured to be coupled to an external eUSB device 108 and to a legacy USB2 device 110. An eUSB2 repeater 112 is necessary to convert a differential eUSB signal (eD+/eD−) to a differential USB signal (D+/D−). The eUSB2 repeater 112 in some examples is on a same PC board as the chip 106, while the eUSB 108 and USB 110 devices are coupled via cabling.

The second configuration 104 is substantially similar to the first configuration 102, except now an SoC 114 includes two USB2 embedded interfaces (as shown).

The eUSB/USB circuits 106, 108, 110, 112, 114 in various example embodiments require differential-signal-detection of some sort, either for squelch detection, disconnect detection, or for some other reason. For example, in some eUSB/USB2 bidirectional high-speed repeaters, squelch detectors in both eUSB and USB2 sides are required, and a disconnect detector in the USB2 side is required.

Squelch detectors can be used to wake high-speed receivers within these circuits 106, 108, 110, 112, 114 from a power-saving mode when communications are received from another USB device. For example, when the USB2 to eUSB path is needed, the USB2 SQD will be enabled and the repeater will be enabled after detection of incoming received signal by USB2 SQD. When the eUSB to USB2 path is needed, the eUSB SQD will be enabled and the repeater will be enabled after detection of incoming received signal by eUSB SQD.

After these circuits 106, 108, 110, 112, 114 are enabled and using the communications channel to exchange data with other devices, the disconnect detector (DCD) can be used to detect any absence, disconnect, or detached peripheral device during active channel use. Disconnect detection may also be required within downstream facing ports for detecting the disconnect state on the line.

These differential-signal-detection circuits (e.g. squelch detectors and disconnect detectors) are often uniquely designed and tailored to their particular application (e.g. squelch, disconnect, etc.).

For example, the eUSB standards specification defines a typical eUSB squelch detector threshold to be 85 mV and the USB2 standards specification defines the typical USB2 squelch detector threshold to be 125 mV. However, in many squelch detector designs, customization may be required to have wide range of programmability on detection threshold, for example, to cover as low as 50 mV or lower, and as high as 160 mV or higher.

Similarly, the USB2 standards specification defines the typical USB2 disconnection detector threshold to be 575 mV, and customization may require a wide range of programmability on detection threshold (e.g. disconnection must be indicated when the amplitude of the differential signal at the downstream facing driver's connector is >/=625 mV, and it must not be indicated when the signal amplitude is <1=525 mV).

Figure 2:
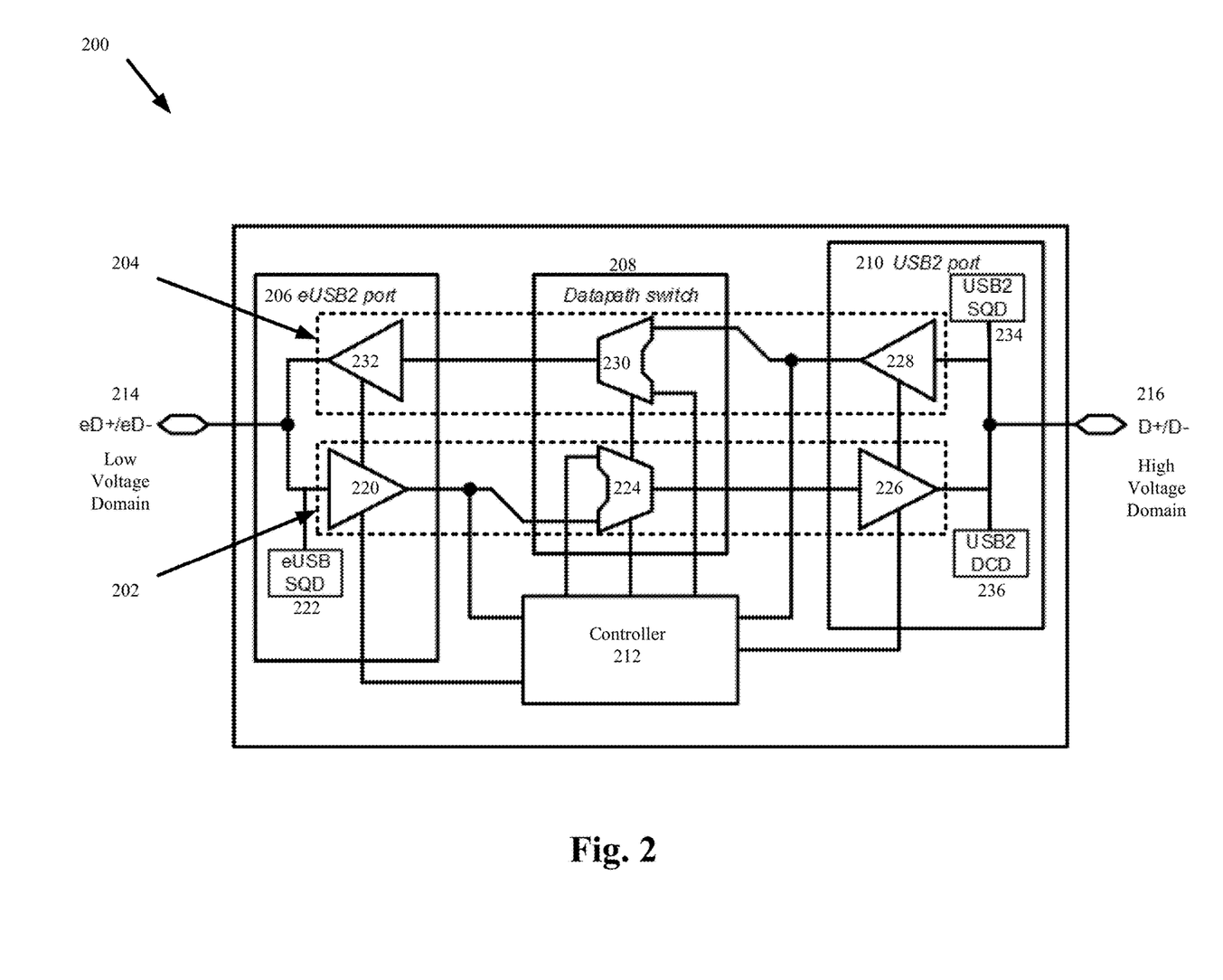
FIG. 2 is a first example bi-directional repeater.

FIG. 2 is a first example bi-directional repeater 200. This example repeater follows the first configuration 102 example in FIG. 1A, but in another example embodiment could follow the second configuration 104 in FIG. 1B.

The repeater 200 includes a first receive/transmit datapath 202, a second receive/transmit datapath 204, an eUSB2 port 206, a datapath switch matrix 208, a USB2 port 210, and a controller 212. The repeater 200 is configured to be coupled to differential eUSB signals (eD+/eD−) 214 in a low voltage domain, and differential USB signals (D+/D−) 216 in a high voltage domain.

The first datapath 202 includes a signal receiver 220 (e.g. slicer), a datapath switch 224, and a signal transmitter 226 (e.g. line-driver). The second datapath 204 also includes a signal receiver 228, a datapath switch 230, and a signal transmitter 232. The datapaths 202, 204 in various embodiments also include (not shown) a continuous time linear equalizer (CTLE), a feed forward equalizer (FFE) for removing most intersymbol interference (ISI), input and termination resistors (RT). RT can be different for different standards (e.g. for an USB2 to an eUSB repeater, input RT=450, output RT=400).

The signal receivers 220, 228 make a (non-linear) hard decision as to whether a data signal is either high or low. This avoids propagation of amplitude noise and allows regeneration of pre-emphasis. The data signal after the signal receivers 220, 228 and before the signal transmitters 226, 232 is in either the lower voltage domain (e.g. 1.8V) or the high voltage domain (e.g. 3.3V), depending upon the datapath 202, 204.

The eUSB2 port 206 includes an eUSB squelch detector (SQD) 222 and the USB2 port 210 includes a USB2 squelch detector (SQD) 234 and a USB2 disconnect detector (DCD) 226. In various example embodiments, a 1.8V Vdd powers the eUSB port 206 and a 3.3V Vdd powers the USB2 port 210.

Figure 3:
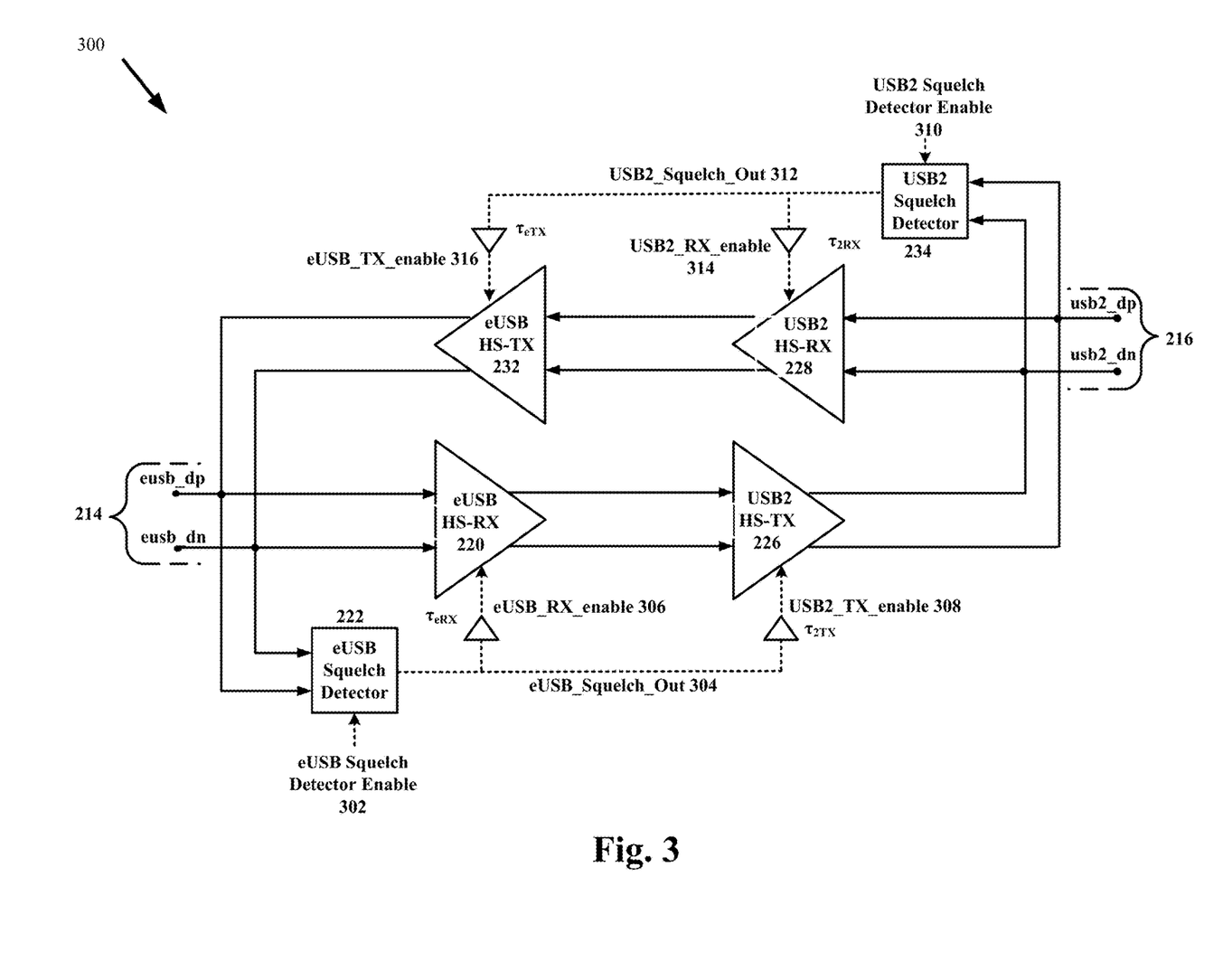
FIG. 3 is a second example bi-directional repeater.

FIG. 3 is a second example bi-directional repeater 300. The second example bi-directional repeater 300 is a simplified representation of the first example bi-directional repeater 200 but with more detail.

The second example bi-directional repeater 300 further shows that the eUSB squelch detector 222 is controlled by an eUSB Squelch Detector Enable 302 and generates an eUSB_Squelch_Out 304 control signal sent to the signal receiver 220 as an eUSB_RX_enable 306 signal and to the signal transmitter 226 as a USB2_TX_enable 308 signal in the first datapath.

The USB2 squelch detector 234 is controlled by a USB2 Squelch Detector Enable 310 and generates a USB2_Squelch_Out 312 signal sent to the signal receiver 228 as a USB2_RX_enable 314 signal and to the signal transmitter 232 as an eUSB_TX_enable 316 signal in the second datapath. The differential eUSB signals 214 and the differential USB signals 216 are also shown.

The bi-directional repeater 300 operates in at least three modes: LS (Low Speed), FS (Full Speed) and HS (High Speed). In many example embodiments, at any given time only one of these modes is functional. HS part of each side will be different from LS/FS part due to speed, level and nature (fully differential and/or single ended) of signals.

The HS (high-speed) sections of the bi-directional repeater 300 is a fully differential section which gets enabled when the squelch detectors 222, 234 detect an incoming received signal above its detection threshold level).

The USB2 side squelch detector 234 enables USB2-to-eUSB repeater in the second datapath (with some delay) and the eUSB side squelch detector 222 enables eUSB-to-USB2 repeater (with some delay).

The eUSB_RX_enable 306 signal and the USB2_TX_enable 308 signal are separated with delays of $\tau_{eRX}$ and $\tau_{2TX}$ for eUSB-To-USB2 repeater and the USB2_RX_enable 314 signal and the eUSB_TX_enable 316 signal are separated with delays of $\tau_{2Rx}$ and $\tau_{eTx}$ for the USB2-to-eUSB repeater.

Due to USB protocol requirements in which the second SYNC bit passed of a HS data packet to USB2 needs to be clean (i.e. A repeater is allowed to swallow up to 4 SYNC bits. Of the SYNC bits it passes through, the first is allowed to be out of spec. The second SYNC bit must be valid and meet USB2 Spec requirements), the squelch detector 222 will detect incoming HS eUSB signal in 1-2nS and the whole HS first datapath needs to be enabled in one UI (data rate=480 Mbps). The eUSB_Squelch_Out 304 control signal directly enables this HS path. Operation is similar for the second datapath.

The squelch detectors 222, 234 provide a fast and fairly accurate circuit which can detect the incoming received HS signals in nano-seconds. The squelch detectors 222, 234 can also be used to indicate whether communications data is invalid, such as when an amplitude of a received differential signal falls below a fixed squelch threshold, they can be susceptible to signal-reflections and channel noise that is incorrectly categorized as an incoming signal, resulting in data errors.

Most noticeable during the HS mode, signal reflections due to a long or defective USB cable result in considerable voltage mismatch between D+ and D− may cause wrong detection by the squelch detector of an USB2-to-eUSB repeater. The impedance mismatch may also be due to other path components in between the two sides of the cable (ex., switches in the path, board routing, flex cables, etc. . . . ).

Because of this, even after a data packet transmitted on a datapath 202, 204 (i.e. FIG. 2) to a device and the transmitter for that datapath is disabled, a longer than expected transmit data reflection signal can be received by the other datapath 204, 202 and be incorrectly interpreted as a new received data from the device, which is then transmitted back to the other side of the repeater 300 to another device. This will cause a ping pong effect resulting in false data can be interpreted as real data, since another USB2 HS packet may begin in as short as 16 ns from the end of the previous packet. Therefore a design has limited amount of time in which it can try and deal with (fix) noise/reflections.

Figure 4:
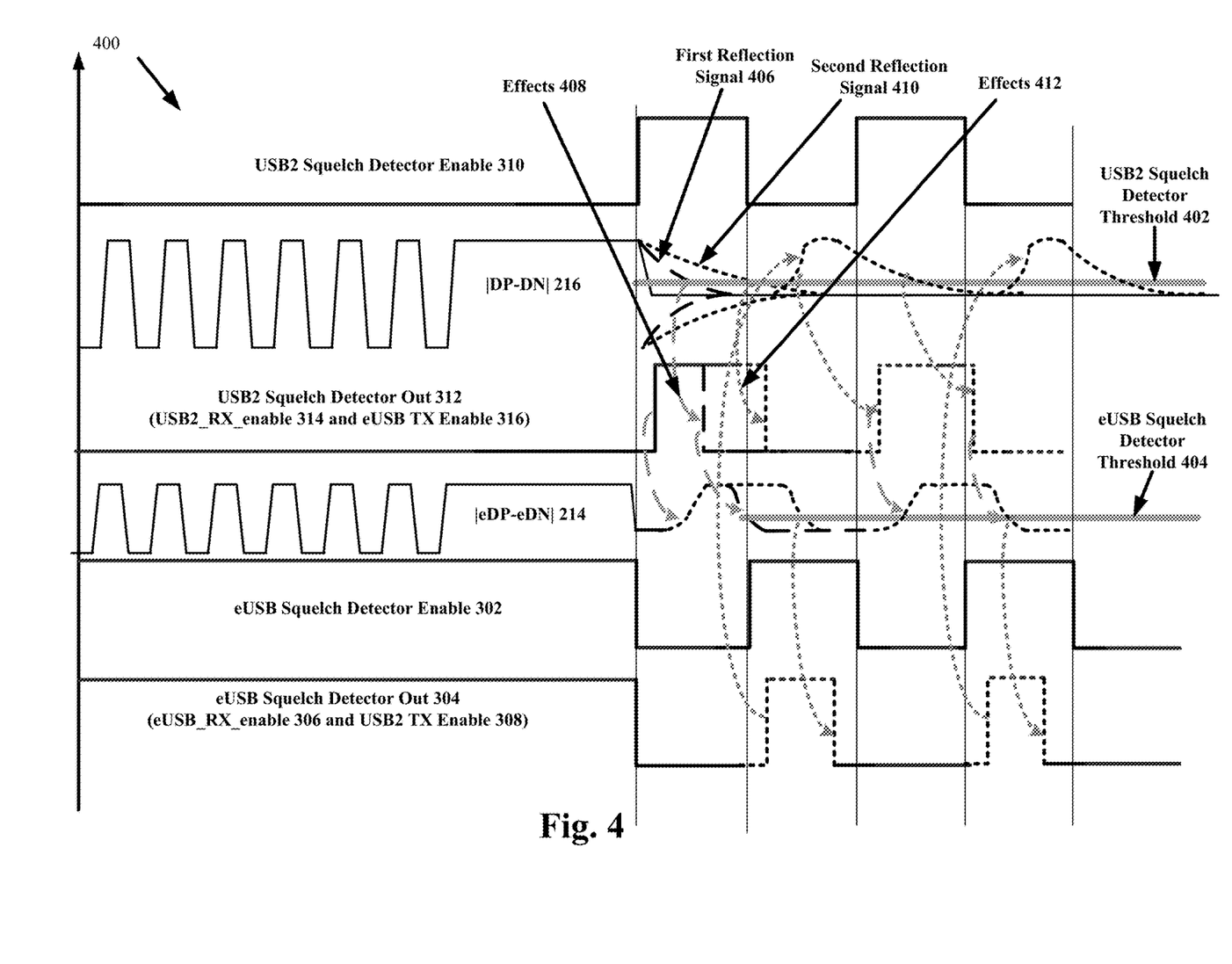
FIG. 4 is an example timing diagram of either the first or second bi-directional repeaters in operation and reflections that may occur.

FIG. 4 is an example timing diagram 400 of either the first or second bi-directional repeaters 200, 300 in operation and reflections that may occur. The timing diagram 400 shows the USB2 squelch detector 234 received signal detection threshold 402 and the eUSB squelch detector 222 received signal detection threshold 404. The signals shown are for illustrative purposes and are not necessarily to scale.

Dashed lines in FIG. 4 show a first reflection signal 406 and associated effects 408. Dotted lines in FIG. 4 show a second reflection signal 410 and associated effects 412. The "arrows" for both types of lines in indicate a causal sequence of effects 408, 412 in the repeaters 200, 300 operation which is further discussed below.

As shown, at an end of a eUSB to USB2 data packet, USB2 signal should go below the USB2 squelch detection level 402 when USB2 squelch is enabled 310. The USB2 Squelch detector gets enabled a few nano-seconds after the USB2 TX gets disabled. There is typically a delay in enabling the USB2 squelch detector from a time the D+/D− lines are released.

In applications where there is a higher than expected parasitic capacitance on the differential USB signal lines 216 or a large noise due to reflection is coming back from a far-end termination (i.e. another device) to the differential USB signal lines 216, then the differential voltage level may remain higher than (i.e. the first reflection signal 406) squelch detector threshold level 402.

If that noise stays longer that a few nano-seconds, it will be detected as valid signal by the USB2 squelch detector causing the USB2-to-eUSB repeater to be incorrectly enabled.

The dashed line 406 shows shorter reflection noise which causes the USB2-to-eUSB datapath to be briefly enabled passing the noise at eUSB side and but then goes away after that.

The dotted lines 410 shows larger reflection effect which causes a more serious issue. The noise at USB2 side will go away and USB2-to-eUSB path will be disabled. When eUSB TX gets enabled, the first bit will be passed from USB2 to eUSB which practically is a noisy bit. If the parasitic cap on eUSB side is larger than considered value for design and holds the charge for longer than the expected time, then eUSB squelch detector is enabled, the remaining charge on parasitic of eUSB side will be detected as valid HS signal.

The eUSB squelch detector will then enable eUSB-to-USB2 path and this time, a noise will be transmitted to USB2 side. This can be repeated a few times due to energy of reflected signal and value of parasitic caps which hold the unwanted charges on either USB2 or eUSB sides (as is shown in dotted waveforms).

One way of avoiding this condition is by delaying RX and TX enable/disable timing or equally add some delay to the enable control and to output signal of the squelch detectors (e.g. delay to the corresponding enable signals, $\tau_{eRX}$ and $\tau_{2Tx}$ and $\tau_{2Rx}$ and $\tau_{eTX}$) However such an approach may break all the needed protocol timing of the chip due to nano-second range decision making points. It will also add risk to some of the protocol compliance tests.

Now discussed are various example embodiments of a communications device an analog method to reduce such impedance mismatch and reflection effects. These example embodiments will not break protocol or other timing of the communications device and will not impact signal integrity specification compliance.

Although the example embodiment of the communications device now discussed is an eUSB-USB2 repeater, the techniques, circuits, and operations described can be applied to many other communications devices either in-chip, between chips, between devices, wired, wireless and so on.

Figure 5:
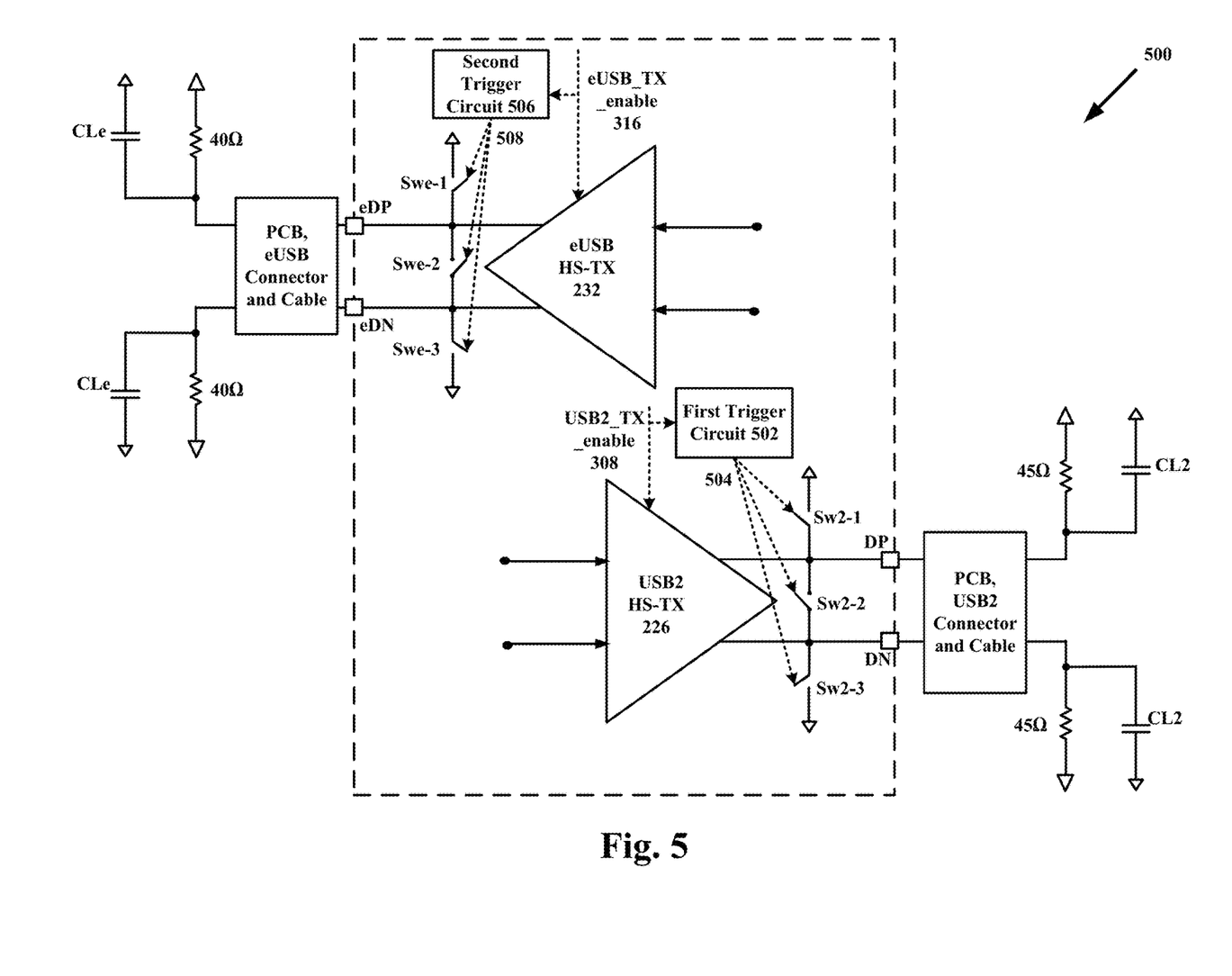
FIG. 5 is an example of a communications device.

FIG. 5 is an example of a communications device 500. The example communications device 500 is a modified version of previously discussed repeaters 200, 300.

The example communications device 500 adds a first trigger circuit 502 (e.g. a one-shot circuit), a first switch USB2 (Sw2-1), a second switch USB2 (Sw2-2), a third switch USB2 (Sw2-3), and a set of USB2 switch control signals 504.

The example communications device 500 also adds a second trigger circuit 506 (e.g. a one-shot circuit), a first switch eUSB (Swe-1), a second switch eUSB (Swe-2), a third switch eUSB (Swe-3), and a set of eUSB switch control signals 508.

At an end of an eUSB to USB2 packet transmission, the first trigger circuit 502 (e.g. a one-shot circuit) sends switch control signal 504 to one or more of the first switch USB2 (Sw2-1), the second switch USB2 (Sw2-2), and/or the third switch USB2 (Sw2-3) which shorts/pulls down to ground one or more of the differential USB signal 216 pins for ~Tws nano-seconds after the end of the USB2 packet.

This effectively blocks noise detection by the second datapath 204 (i.e. signal receiver 228) from any possible reflection signals on the differential USB signal 216 lines either by eliminating any differential voltage on the pins 216 or having a differential voltage below the USB2 squelch detection threshold 402 while one or more of the switches are closed.

At an end of a USB2 to eUSB packet transmission, the second trigger circuit 506 (e.g. a one-shot circuit) sends switch control signal 508 to one or more of the first switch eUSB (Swe-1), the second switch eUSB (Swe-2), and/or the third switch eUSB (Swe-3) which shorts/pulls down to ground one or more of the differential eUSB signal 214 pins for ~Twp nano-seconds at the beginning of the eUSB packet and also for ~Twn nano-seconds after the end of the eUSB packet.

This effectively blocks noise detection by the first datapath 202 (i.e. signal receiver 220) from any possible reflection signals on the differential eUSB signal 214 lines either by eliminating any differential voltage on the pins 214 or having a differential voltage below the eUSB2 squelch detection threshold 404 while one or more of the switches are closed.

Figure 6A:
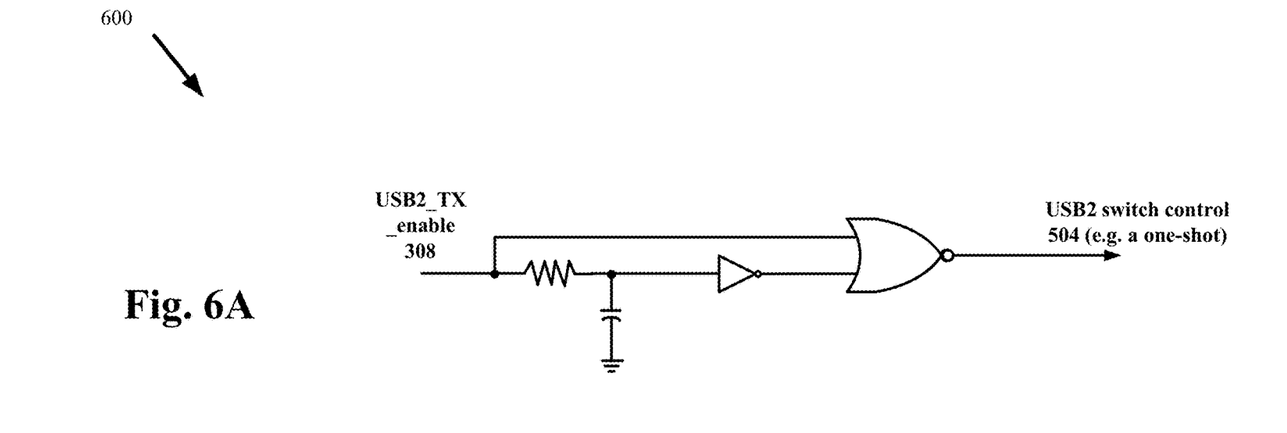
FIG. 6A example of first trigger circuit (e.g. a one-shot circuit).
Figure 6B:
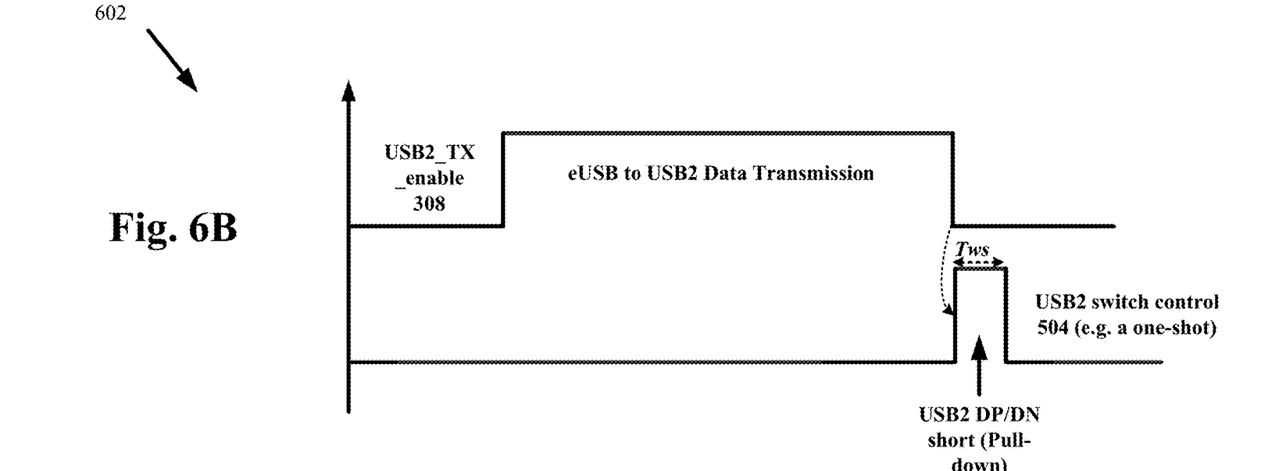
FIG. 6B example timing of the first trigger circuit.

FIG. 6A example 600 of first trigger circuit 502 (e.g. a one-shot circuit) and FIG. 6B is an example timing 602 of the first trigger circuit 502.

As introduced in the FIG. 5 discussion, the first trigger circuit 502 in some example embodiments can be a one-shot circuit such as shown. The USB2_TX_enable 308 signal is received by both the signal transmitter 226 (i.e. USB2 HS-TX 226 in FIG. 4) and the one-shot circuit.

In response to the USB2_TX_enable 308 signal transitioning to active (e.g. positive edge of FIG. 6B waveform), then eUSB to USB2 data transmission occurs.

Then in response to the USB2_TX_enable 308 signal transitioning to inactive (e.g. negative edge of FIG. 6B waveform), then the first trigger circuit 502 (e.g. a one-shot circuit) outputs a USB2 DP/DN short (Pull-down) pulse for a time of Tws ns using the USB2 switch control 504 signals to one or more of the three switches shown in FIG. 5 which then dumps any received reflection energy.

A width of one-shot pulse can be adjusted by adjusting a value of the FIG. 6A resistor or capacitor for best reflection blocking performance for a particular application.

In other example embodiments, the USB2 switch control 504 signals sent to one or more of the three switches can be generated by two circuits, where the second circuit uses an inverted signal of the USB2_TX_enable 308 signal. This may provide more flexibility to tune the one-shot pulse.

Figure 7A:
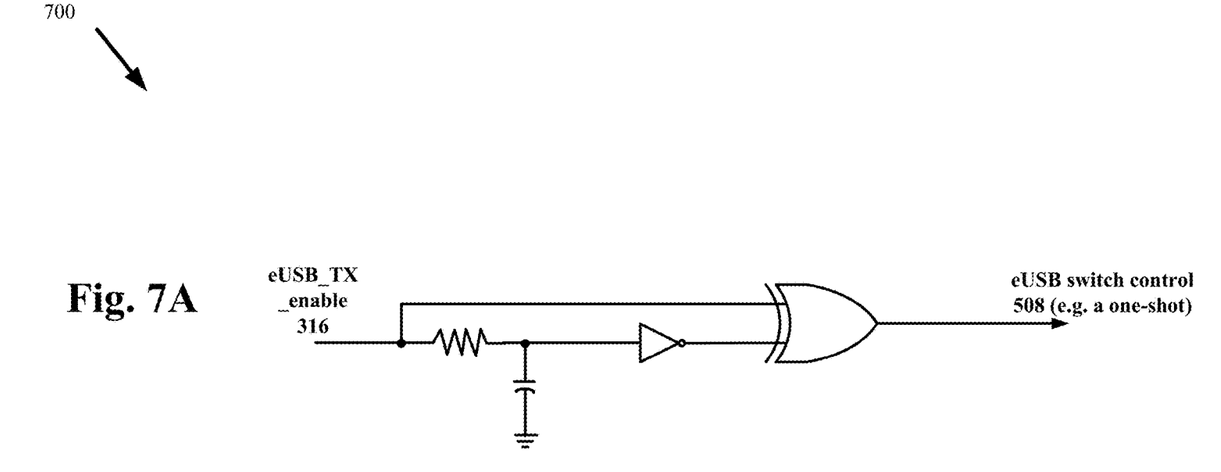
FIG. 7A example of second trigger circuit (e.g. a one-shot circuit).
Figure 7B:
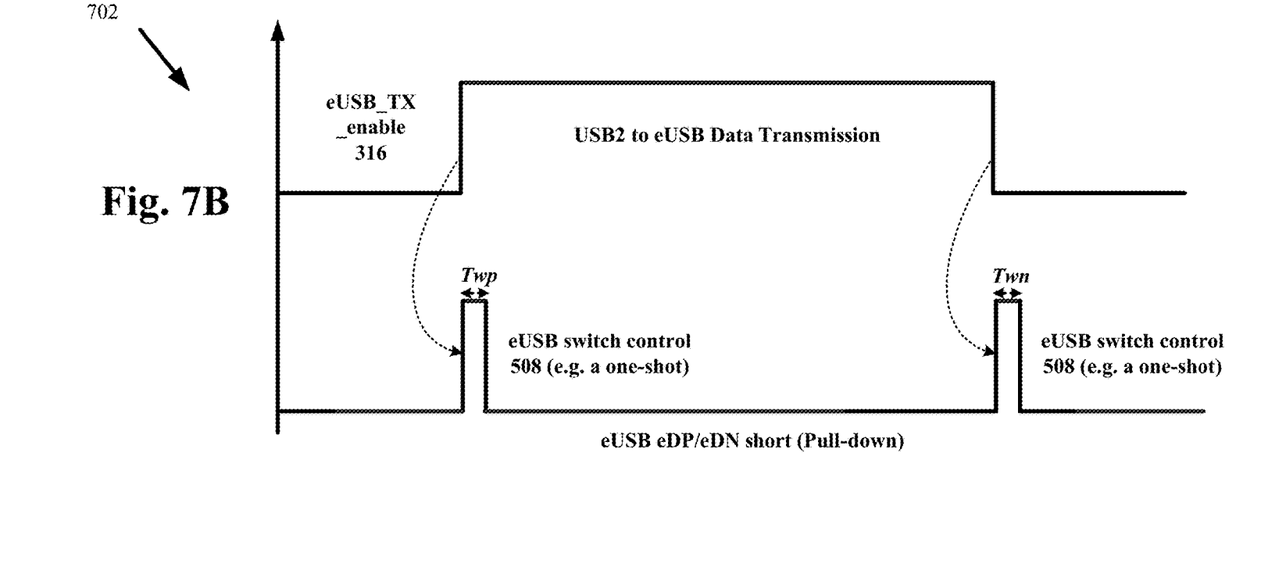
FIG. 7B example timing of the second trigger circuit.

FIG. 7A example 700 of second trigger circuit 506 (e.g. a one-shot circuit) and FIG. 7B is an example timing 702 of the second trigger circuit 506.

Also as introduced in the FIG. 5 discussion, the first trigger circuit 506 in some example embodiments can be a one-shot circuit such as shown. The eUSB_TX_enable 316 signal is received by both the signal transmitter 232 (i.e. eUSB HS-TX 232 in FIG. 4) and the one-shot circuit.

In response to the eUSB_TX_enable 316 signal transitioning to active (e.g. positive edge of FIG. 7B waveform), the second trigger circuit 506 (e.g. a one-shot circuit) outputs an eUSB eDP/eDN short (Pull-down) for a time of Twp ns using the eUSB switch control 508 signals to one or more of the three switches shown in FIG. 5. Then USB2 to eUSB data transmission occurs.

Then in response to the eUSB_TX_enable 316 signal transitioning to inactive (e.g. negative edge of FIG. 7B waveform), then the second trigger circuit 506 outputs another eUSB eDP/eDN short (Pull-down) pulse for a time of Twn ns using the eUSB switch control 508 signals to one or more of the three switches shown in FIG. 5 which then dumps any received reflection energy.

A width of one-shot pulse can be adjusted by adjusting a value of the FIG. 7A resistor or capacitor for best reflection blocking performance for a particular application.

In other example embodiments, the eUSB switch control 508 signals sent to one or more of the three switches can be generated by two circuits, where the second circuit uses an inverted signal of the eUSB_TX_enable 316 signal. This may provide more flexibility to have independent control of the two one-shot pulses.

While FIGS. 6A and 6B have referred to the first trigger circuit 502 and FIGS. 7A and 7B have referred to the second trigger circuit 506, in other example embodiments both trigger circuits 502, 506 may use a same circuit.

While example embodiments of signaling between eUSB and USB devices have been primarily discussed, the concepts and examples discussed applied to a wide variety of such electrical signaling interfaces (e.g. intra-chip signaling, inter-chip/device signaling, hard-wire signaling, wireless-signaling, etc.

Also, while in the example embodiments discussed above, various functions and operations are implemented using circuits and logic, in other example embodiments such functions and operations could be implemented in firmware, software, and analog or digital hardware.

For any example embodiments that may be implemented in either firmware, software, hardware, analog, and/or digital, the instructions could be embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A communications device, comprising:
an interface port, configured to couple the communications device to another device;
a transmitter configured to transmit signals on an output of the interface port;
a receiver configured to receive signals on an input of the interface port;
a signal detector configured to enable the transmitter in response to a signal to be transmitted on the output of the interface port and disable the transmitter after the signal is transmitted;
a switch having a control input and coupled between the output of the interface port and a reference potential;
a trigger circuit coupled between the signal detector and the control input of the switch;
wherein the trigger circuit is configured to pulse the control input of the switch in response to at least one of the enable or the disable of the transmitter by the signal detector; and
wherein the switch is configured to connect the output of the interface port to the reference potential for a duration of the pulse on the control input.

2. The communications device of claim 1:
wherein the switch, in response to the pulse, connects the interface port to the reference potential before the transmitter transmits signals on the interface port.

3. The communications device of claim 1:
wherein the switch, in response to the pulse, connects the interface port to the reference potential both before and after the transmitter transmits signals on the interface port.

4. The communications device of claim 1:
wherein the signal detector is a squelch detector.

5. The communications device of claim 1:
wherein the switch, in response to the pulse, connects the interface port to the reference potential when the signal detector disables the transmitter.

6. The communications device of claim 5:
wherein the interface port is a USB2 interface port.

7. The communications device of claim 1:
wherein the switch, in response to the pulse, connects the interface port to the reference potential when the signal detector enables the transmitter.

8. The communications device of claim 7:
wherein the interface port is an eUSB interface port.

9. The communications device of claim 1:
wherein the reference potential is a ground reference.

10. The communications device of claim 1:
wherein the trigger circuit is a one-shot circuit.

11. The communications device of claim 1:
wherein the interface port includes a first differential line and a second differential line; and
wherein the signal is a differential signal.

12. The communications device of claim 11:
wherein the switch is a first switch and the reference potential is a first reference potential;
wherein the first switch, in response to the pulse, connects the first differential line to the first reference potential when the signal detector enables the transmitter;
further comprising a second switch coupled to the trigger circuit and in response to the pulse, connects the second differential line to a second reference potential when the signal detector disables the transmitter.

13. The communications device of claim 12:
further comprising a third switch coupled to the trigger circuit and in response to the pulse, connects the first differential line to the second differential line when the signal detector disables the transmitter.

14. The communications device of claim 12:
wherein the differential signal lines are compliant with either a USB standard protocol or an eUSB standard protocol.

15. The communications device of claim 1:
wherein the interface port is a first interface port, the receiver is a first receiver and the transmitter is a first transmitter;
wherein the communications device includes a second interface port, a second transmitter and a second receiver;
wherein the second transmitter is configured to transmit the signals received by the first receiver through the second interface port;
wherein the second receiver is configured to receive signals from the second interface port; and wherein the first transmitter is configured to transmit the signals received by the second receiver through the first interface port.

16. The communications device of claim 1:
wherein the communications device is embedded in at least one of: a bidirectional repeater, a bidirectional level-shifter, or a transceiver.

17. The communications device of claim 1:
wherein the another device is at least one of: another circuit in a chip, another chip, another device, a communications cable, or a wireless antenna.

* * * * *